July 3, 1962 — S. N. COHEN — 3,042,426
FOLDED CASH REGISTER TAPE
Filed Nov. 5, 1959 — 2 Sheets-Sheet 1
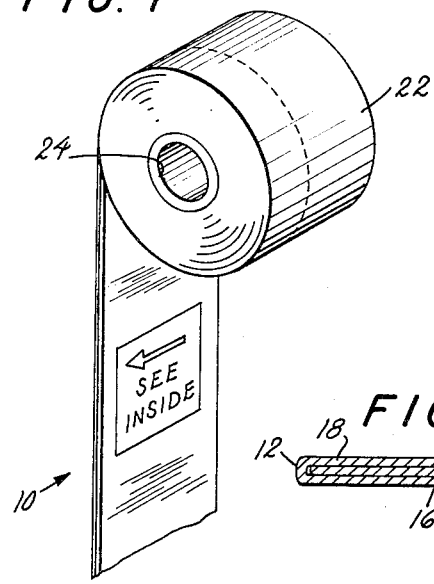
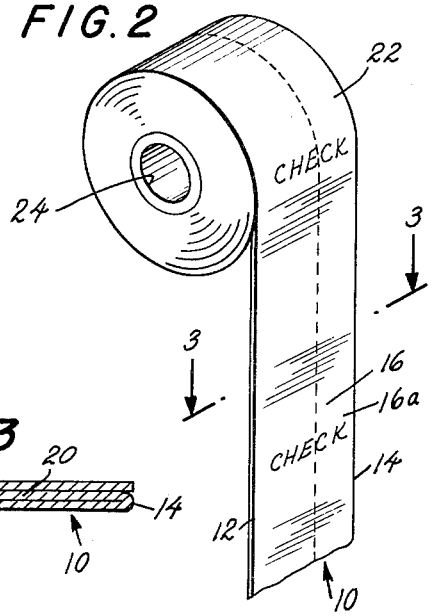
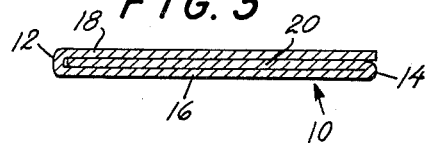
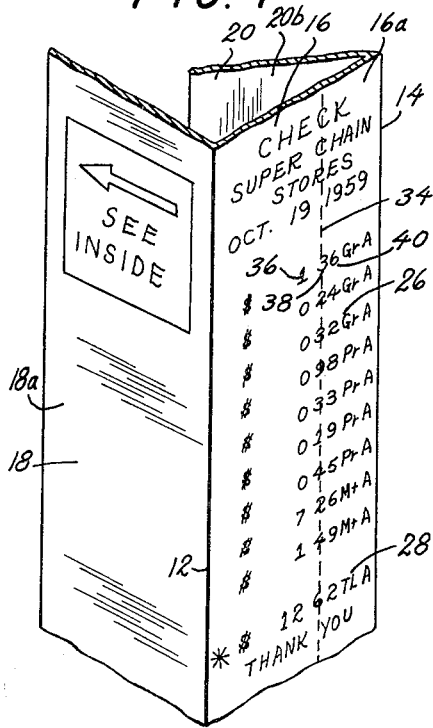
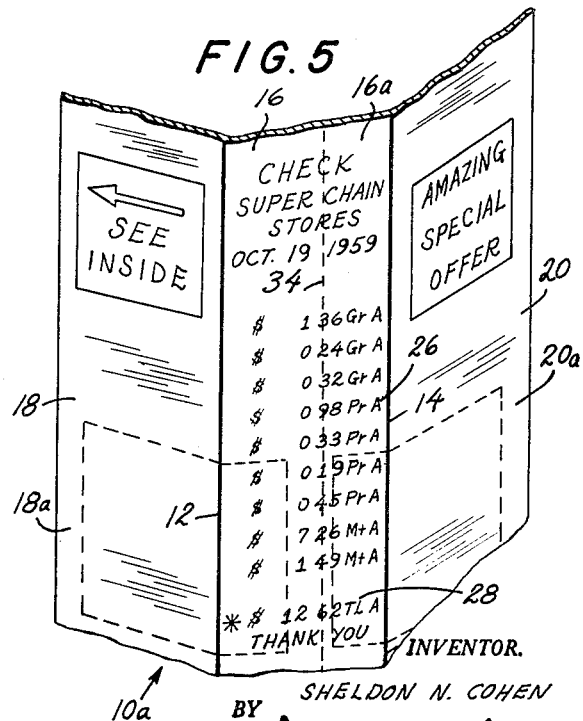
INVENTOR.
SHELDON N. COHEN
BY Amster + Levy
ATTORNEYS July 3, 1962 S. N. COHEN 3,042,426
FOLDED CASH REGISTER TAPE
Filed Nov. 5, 1959 2 Sheets-Sheet 2
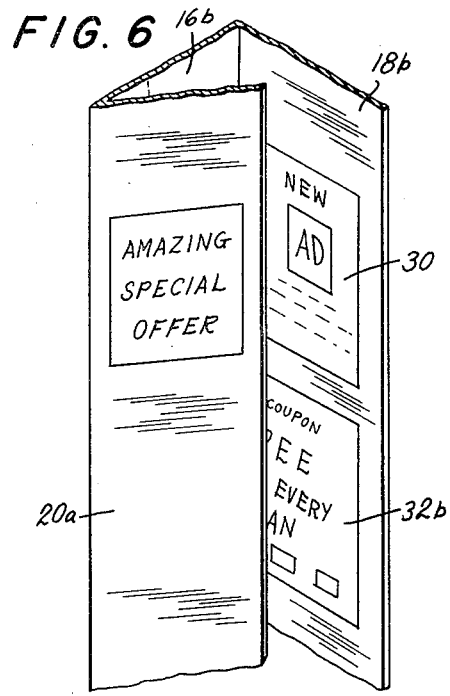
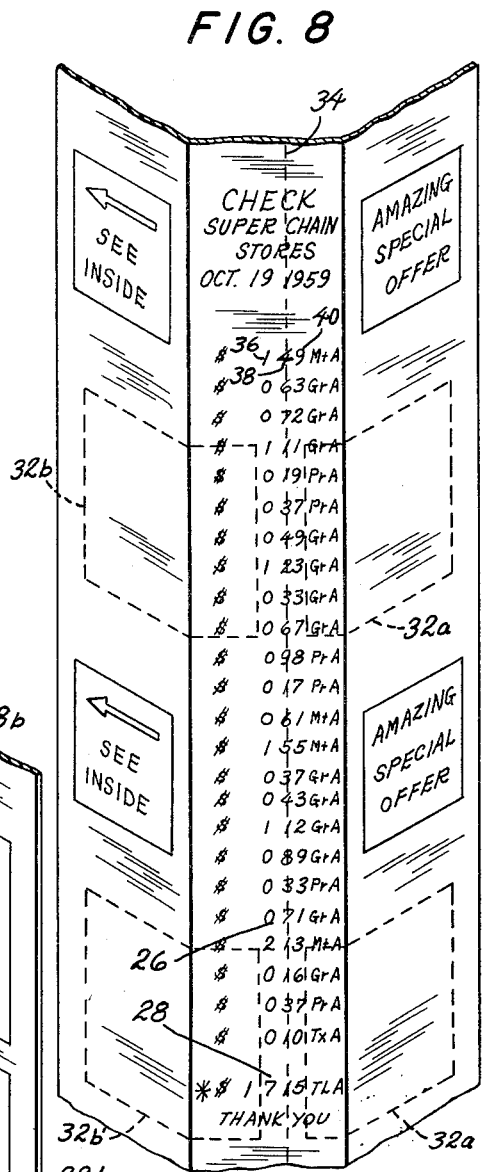
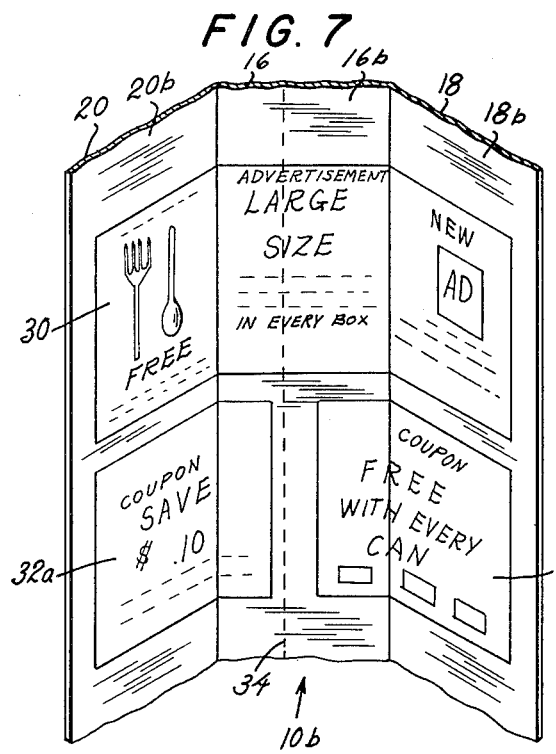
INVENTOR.
SHELDON N. COHEN
BY Amster + Levy
ATTORNEYS

United States Patent Office 3,042,426
Patented July 3, 1962

3,042,426
FOLDED CASH REGISTER TAPE
Sheldon N. Cohen, New York, N.Y., assignor to Check-Out Advertising, Inc., New York, N.Y., a corporation of New York
Filed Nov. 5, 1959, Ser. No. 851,114
4 Claims. (Cl. 283—62)

The present invention relates generally to cash registers, and more particularly to an improved paper tape for use in cash registers. Advantageously my improved paper tape may be used in the conventional manner in cash registers for the recordation and tabulation of items purchased and in addition may be used to carry advertising matter, redeemable coupons, and the like.

The use of redeemable coupons to advertise consumer items is a well known, and highly successful advertising expedient. Generally the consumer is given a coupon which may be used to pay for, in part, the item advertised thereon. The distribution of these coupons has heretofore been an expensive and inefficient process. Usually direct mailing methods are employed to send these coupons to the consumer. Due to the problems inherent in bulk mailing the coverage obtained by this method often misses many potential consumers and at the same time needlessly places these coupons in the hands of persons who would have no occasion to use them. The high cost of direct mailing techniques combined with its inherent inefficiency and comparatively poor distribution has produced a need for an improved means to get these redeemable coupons into the hands of the consuming public.

Broadly, the object of the present invention is to fill the above mentioned need. Specifically the present invention has as its object to provide a folded cash register tape and method for use thereof which will allow advertisers to place commercial messages thereon in addition to the conventional itemized tabulations printed by the cash register.

It is still a further object of the present invention to provide a cash register tape which will provide the characteristics of the conventional cash register tapes and in addition provide a means of distributing redeemable coupons to the consuming public and which will perform this function efficiently and at low cost.

In accordance with an illustrative embodiment of my invention there is provided a paper tape for use in a cash register which is wider than the tape width normally used in such machines. The tape is folded in thirds in a longitudinal direction, the outer thirds, or wing section, being folded back away from the front face and against the back face of the medial third such that the folded tape is approximately one third the width of the unfolded tape. The tape is provided in rolled form, with the front face of the medial section facing out such that the tape may be used in the conventional cash register in the conventional manner, the cash register tabulations being imprinted on the said front face of the medial section. The back face and the front faces of the wing sections are available for use as advertising space. In the presently preferred embodiment the advertising space is utilized as a means for distributing redeemable coupons and for advertising copy concerned therewith. This is accomplished by printing these coupons, alternated with advertising messages, on the back face of the tape in a lengthwise spacing such that the shortest tape (one with only one item sold) will include one thereon.

In order to maximize the number of individual coupons for different products that may be distributed on one cash register receipt printed on this improved paper tape, the tape is divided in half in a lengthwise direction, with one coupon printed on each half. Since it is advantageous to distribute only one coupon for each product with each sale, no matter how many items are included in each sale, means are provided to make only one pair of coupons valid no matter how many items on the tape and therefore no matter how long the tape. This means includes the central dividing line between the two coupons on either side thereof, and the column of figures showing items sold. The figures are on the front face of the tape and the coupons are printed on the back face thereof such that when a coupon is detached from the rest of the tape it will have figures printed on the back thereof. Since the dividing line is positioned to split the first digit to the right of the decimal point of the printed figures, coupons on either side of the line will show whether figures were printed thereon by the cash register. Only those coupons which have the total amount of sale printed on the back thereof, or on the back of the adjacent advertising message, will be entitled to redemption, and only if that figure is in excess of $0.09. (This can be varied to be only in excess of $0.99 by moving the dividing line to bisect the first digit to the left of the decimal figure.) Thus, the invention provides a means for distributing redeemable coupons to the very consumers the advertiser seeks to contact by the expedient of this folded cash register tape.

The above brief description as well as further objects, features and advantages of the present invention will be best appreciated by reference to the following detailed description of a presently preferred embodiment when taken in conjunction with the accompanying drawings wherein:

FIG. 1 is a perspective view of a roll of an improved cash register paper tape;

FIG. 2 is similar to FIG. 1 but taken from the opposite direction and shows the face of the tape on which the cash register prints a tabulation of items sold;

FIG. 3 is a sectional view of the tape shown in FIGS. 1 and 2 taken along the line 3—3 in FIG. 2 and looking in the direction of the arrows;

FIG. 4 is a perspective view of the tape shown in FIGS. 1 and 2 after it has been printed on by a cash register and is shown in a partially unfolded state;

FIG. 5 is a view similar to FIG. 4 but showing the tape further unfolded;

FIG. 6 is a perspective view similar to FIG. 4 but seen from the opposite side;

FIG. 7 is a perspective view similar to FIG. 5 but seen from the opposite side; and FIG. 8 is a view similar to FIG. 5 but showing a typical tape of comparatively long length and including, in shadow, the printing on the back side of the tape.

Referring now specifically to the drawings, there is shown a tape according to the present invention which is generally designated by the numeral 10. The tape 10 consists of a long thin strip of paper having a front face 10a and a rear face 10b. As seen in FIG. 3, the tape 10 has been folded twice along its length at folds 12 and 14 thereby creating three sections, medial section 16, left wing section 18 and right wing section 20, each of the three sections 16, 18, 20 being of approximately equal width. In the presently preferred embodiment the two wing sections 18, 20 are folded at folds 12 and 14 respectively against the back of the middle section 16 with right section 20 underlying left section 18. The width of the folded tape is the distance between folds 12 and 14, or the width of the medial section 16. This width is selected to be the standard width of cash register tape. Thus when the tape 10 is rolled into a roll 22 on a spool 24 it is capable of performing all the functions required of a standard roll of standard cash register tape.

The roll 22 is formed such that the tape 10 is rolled thereupon with the front face 16a of medial section 16 facing out. When the roll 22 is inserted into a cash register and mounted by the spool 24 it is used in the conventional manner. The finished tape which is received by the customer has the tabulation of the individual items sold 26 and the total 28 appearing in the usual fashion on the front face 16a of the medial section 16, as shown in FIG. 4. The two wing sections 18, 20, having front and back faces 18a, 20a, 18b, 20b respectively, and the back face 16b of medial section 16 do not receive any printing from the cash register, said areas being employed for other purposes as will be hereinafter described.

Advantageously, the cash register tape 10, according to the present invention, provides areas adapted to receive advertising media. In particular the preferred embodiment of the present invention provides a means for the distribution of redeemable coupons. As seen in FIGS. 6 and 7, the back face 10b of tape 10, consisting of the back faces 16b, 18b and 20b, of the three sections 16, 18, 20, have not been utilized in the usual functioning of the tabulation of items in the standard cash register. Printed on these faces there is a box 30 for advertising copy and redeemable coupons 32a, 32b. The pair of coupons 32a, 32b will normally be utilized for two different products. The box 30 and a pair of redeemable coupons 32a, 32b are alternately printed in a longitudinal direction, along the length of the tape 10 with redeemable coupons 32a and 32b being printed in a side by side relation on either side of the dividing line 34 which runs longitudinally along the length of the medial section 16. The dividing line 34 is formed by perforations such that the tape 10 may be split apart along the dividing line 34. After a customer has received the tape 10, in its printed form such as is shown in FIG. 6, he may split the tape along the dividing line 34 thus separating the part with the left-hand coupon 32a from the part with the right-hand coupon 32b. Coupon 32a or coupon 32b can then be utilized by the customer in the conventional manner.

Since it is advantageous to distribute only one coupon for a given product at each sale, means are provided such that only one pair of coupons on each tape, no matter how long the tape, are valid for redemption. This means utilizes the location of the total figure 28 of the tabulation 26 in relation to the coupons 32a, 32b, and the placement of the dividing line 34 such that it bisects the first column to the right of the decimal point in the tabulation 26. As is best seen in FIG. 5, numeral 36 indicates the single digit dollar column, 38 indicates the tens column to the right of the decimal point and numeral 40 indicates the ones column. The perforated dividing line 34 is positioned such that it splits the numerals in column 38. Thus when coupon 32a is separated from coupon 32b, by splitting along dividing line 34, it may be easily determined whether the coupons 32a, 32b have come from a valid sale. In the presently preferred embodiment the tape 10 is arranged such that coupons will only be valid on a sale in excess of $0.09 as will be readily understood since only then will any numbers appear in columns 36 and 38. Similarly, the tape 10 may be arranged to have valid coupons on any sale by placing the dividing line 34 on the ones column 40.

In the event of a sale of many items, thus producing a relatively long tape, the customer will receive more than one pair of coupons, illustrated in FIG. 8 by coupons 32a, 32b and coupons 32a', 32b'. However, as explained above, it is desirable that only one pair of these coupons be valid for redemption. In the case illustrated, only coupons 32a', 32b' will be redeemable because only those coupons include on their back face the total 28 of the tabulation 26. If the total 28 does not fall directly on the back of a pair of coupons 32a, 32b, than only those coupons 32a, 32b which are next to the total 28 will be redeemable.

The front faces 18a, 18b, of the wing sections 18, 20 are adaptable as advertising space. Since front face 18a will be the first face of the tape 10 seen by a customer when the tape is in its unfolded state, face 18a is utilized to carry advertising copy which induces the customer to open the folds 12, 14 to reveal the coupons 32a, 32b contained therein.

A brief summary of the utilization of the present invention will now be given. The roll 22 of tape 10 is inserted in a conventional cash register in the conventional manner, the tape 10 being adapted to perform the functions of the standard cash register tape; the tabulations 26 are printed on the front face 16a of medial section 16. When the customer receives the tape 10 it is in its folded state. The customer sees the messages printed on face 18a, and then 20a, and when the tape is completely unfolded the tape appears as is illustrated in FIG. 7. The customer receives at least one pair of coupons 32a, 32b on each tape and by splitting the tape along dividing line 34 he may redeem the separate coupons in the usual manner. If the tape contains more than one pair of coupons 32a, 32b, as illustrated in FIG. 8, only the last pair of coupons, 32a', 32b' in FIG. 8, are valid for redemption because only that pair have the total 28 imprinted on the back thereof. The location of the dividing line 34 is such that the storekeeper who redeems the individual coupons 32a or 32b will be able to tell whether the total sale recorded by the tape was in excess of $0.09 thus providing a means to allow redemption of coupons only when the coupons 32a, 32b were obtained by a true sale.

A latitude of modification, substitution and change is intended in the foregoing disclosure and in some instances some features of the invention will be used without a use of other corresponding features. Accordingly, the claims herein should be construed broadly and in a manner consistent with the spirit and scope of the invention.

What I claim is:

1. A paper tape for use in a cash register comprising a tape strip having a front face, a back face and opposite side edges, said tape strip being formed with two longitudinally extending fold lines spaced inwardly from said opposite side edges to define a medial section bounded at opposite sides by said fold lines and two wing sections each bounded at one side by a fold line and at its other side by one of said side edges, said medial section being divided longitudinally by a line of perforations such that said tape may be split along said line of perforations, said front face of said medial section being adapted to have a column of figures imprinted thereon by said cash register, said perforations being positioned on said medial section such that said column of figures is superimposed thereon, said wing sections being folded back along said fold lines and against the back face of said medial section, said wing section being adapted to receive printed advertising messages, said tape in its folded state being rolled for use in a cash register.

2. A tape for use in cash register comprising an elongated paper strip having front and rear faces and a pair of opposed parallel side edges, a pair of parallel fold lines formed in said strip parallel to and inwardly of said side edges defining a medial section within said fold lines and a pair of wing sections each bordered by one of said fold lines and one of said edges, said medial section being formed with longitudinal perforations parallel to and intermediate said fold lines, advertising indicia printed on said front face of said strip within said wing sections with the front face of said medial section being free from advertising and adapted to receive the imprintation of a column of figures from said cash register with one column of said figures overlying said perforations, and further advertising indicia printed on the rear face of said strip on said wing sections and said medial section.

3. A tape for use in a cash register comprising an elongated paper strip having front and rear faces and a pair of opposed parallel side edges, a pair of parallel fold lines formed in said strip parallel to and inwardly of said side edges defining a medial section within said fold lines and a pair of wing sections each bordered by one of said fold lines and one of said edges, said medial section being formed with perforations extending the length of said tape strip parallel to and intermediate said fold lines, advertising indicia printed on said front face of said strip and within said wing sections, said front face of said medial section being adapted to receive the imprintation of a column of figures from said cash register, and further advertising indicia printed on the rear face of said strip on said wing sections and said medial section, said further advertising indicia including groups of two coupons printed at periodical intervals along the length of said strip and on opposing sides of said perforations.

4. A tape for use in a cash register comprising an elongated paper strip having front and rear faces and a pair of opposed parallel side edges, a pair of parallel fold lines formed in said strip parallel to and inwardly of said side edges defining a medial section within said fold lines and a pair of wing sections each bordered by one of said fold lines and one of said edges, said medial section being formed with perforations extending the length of said tape strip parallel to and intermediate said fold lines, said tape being rolled with said wing sections folded inwardly along said fold lines and lying against said rear face of said medial section for use in a cash register, advertising indicia printed on said front face of said strip and within said wing sections with the front face of said medial section being free from advertising and adapted to receive the imprintation of a column of figures from said cash register with one column of said figures overlying said perforations, and further advertising indicia printed on the rear face of said strip on said wing sections and said medial section, said further advertising indicia including groups of two coupons printed at periodical longitudinal intervals on the rear face of said strip and on opposing sides of said perforations.

References Cited in the file of this patent

UNITED STATES PATENTS

| | | |
|---|---|---|
| 426,503 | Keller | Apr. 29, 1890 |
| 1,011,549 | Yantis | Dec. 12, 1911 |
| 1,186,382 | Daly | June 6, 1916 |
| 1,380,081 | Saunders | May 31, 1921 |
| 2,377,348 | Lee | June 5, 1945 |
| 2,801,018 | Yount | July 30, 1957 |